(12) United States Patent
Weissert et al.

(10) Patent No.: US 6,880,248 B2
(45) Date of Patent: Apr. 19, 2005

(54) MOTOR DRIVEN IMPLEMENT

(75) Inventors: Wolfgang Weissert, Winnenden (DE);
Hans Peter Stehle, Winnenden (DE)

(73) Assignee: Andreas Stihl AG & Co. (DE)

( * ) Notice: Subject to any disclaimer, the term of this patent is extended or adjusted under 35 U.S.C. 154(b) by 25 days.

(21) Appl. No.: 10/157,729

(22) Filed: May 28, 2002

(65) Prior Publication Data

US 2002/0166239 A1 Nov. 14, 2002

Related U.S. Application Data

(63) Continuation-in-part of application No. 09/549,767, filed on Apr. 14, 2000, now abandoned.

(30) Foreign Application Priority Data

Apr. 16, 1999 (DE) .......................................... 199 17 238

(51) Int. Cl.[7] ................................................. B26B 7/00
(52) U.S. Cl. ............................. 30/276; 30/240; 30/264; 30/277.4
(58) Field of Search ......................... 30/276, 240, 264, 30/277.4, 296.1, 381, 228, 296.12, 76, 275.4; 81/57.13, 57.29, 177.2, 57.42, 57.45; 74/587, 511 R; 285/238, 390; 403/383, 296, 384; 411/383, 411, 414; 464/182, 183, 184; 237/179.1, 180.1

(56) References Cited

U.S. PATENT DOCUMENTS

| | | | | |
|---|---|---|---|---|
| 60,792 A | * | 1/1867 | Russell et al. | 464/184 |
| 95,614 A | * | 10/1869 | Spear | 285/390 |
| 804,030 A | * | 11/1905 | Ostrander | 464/184 |
| 2,366,067 A | * | 12/1944 | Smith | 285/107 |
| 4,421,497 A | * | 12/1983 | Federmann et al. | 464/181 |
| 4,654,971 A | * | 4/1987 | Fettes et al. | 30/296.1 |
| 4,817,738 A | | 4/1989 | Dorner et al. | |
| 4,895,351 A | * | 1/1990 | Devaud | 267/69 |
| 4,913,578 A | * | 4/1990 | Baus | 403/270 |
| 4,924,573 A | * | 5/1990 | Huddleston et al. | 30/296.1 |
| 4,936,886 A | * | 6/1990 | Quillen | 172/14 |
| 4,952,195 A | * | 8/1990 | Traylor | 464/183 |
| 5,175,932 A | | 1/1993 | Lange et al. | |
| 5,718,050 A | * | 2/1998 | Keller et al. | 30/123.4 |
| 5,819,418 A | * | 10/1998 | Uhl | 30/296.1 |
| 5,997,231 A | * | 12/1999 | Goodwin et al. | 411/411 |
| 6,336,986 B1 | * | 1/2002 | Lee et al. | 464/183 |

FOREIGN PATENT DOCUMENTS

| | | |
|---|---|---|
| EP | 0 365 703 | 5/1990 |
| JP | 5060122 | 3/1993 |
| JP | 11056067 | 3/1999 |
| JP | 11275925 | 10/1999 |
| SE | 507 826 | 1/1996 |
| SE | 457 938 | 10/1997 |

OTHER PUBLICATIONS

Abstract JP 04004810.

* cited by examiner

*Primary Examiner*—Allan N. Shoap
*Assistant Examiner*—Carolyn Blake
(74) *Attorney, Agent, or Firm*—Robert W. Becker & Associates; Robert W. Becker

(57) ABSTRACT

An implement having a drive motor and a tool is provided. A drive shaft is mounted in a guide tube and interconnects the drive motor and tool for rotatingly driving the tool. The drive shaft includes a main member in the form of a hollow shaft having ends on which are disposed respective extensions that form a coupling connection for a positive engagement with coupling components of the drive motor and of the tool.

11 Claims, 3 Drawing Sheets

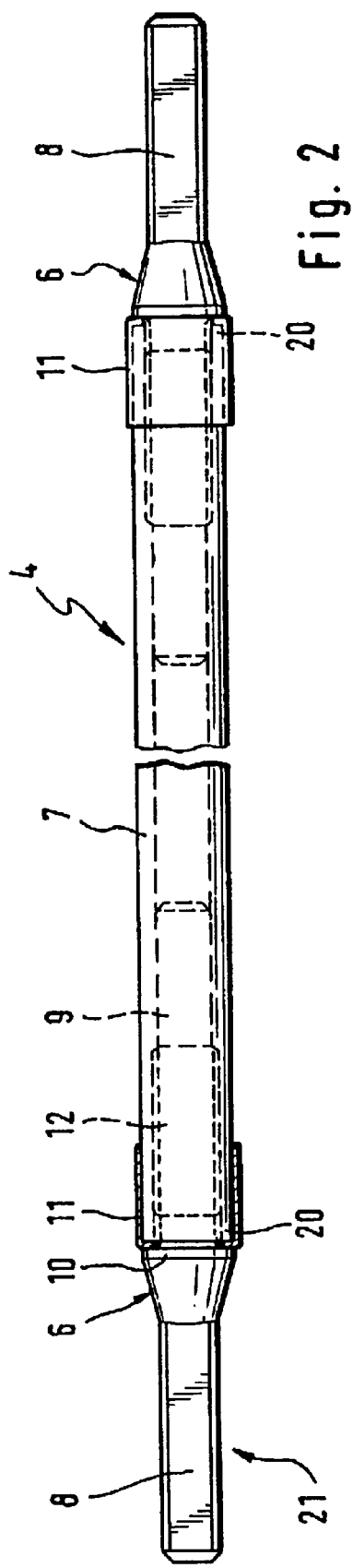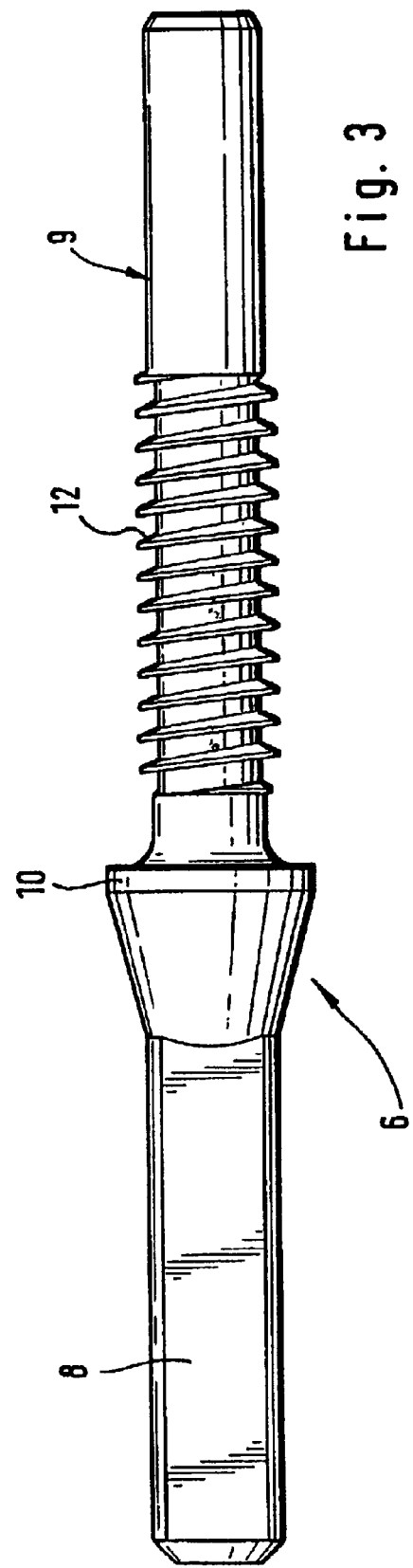

MOTOR DRIVEN IMPLEMENT

CROSS-REFERENCE TO RELATED APPLICATIONS

This application is a continuation-in-part of application Ser. No. 09/549,767 filed Apr. 14, 2000, now abandoned.

BACKGROUND OF THE INVENTION

With implements such as brush cutters or the like, the tool is disposed at the end of a guide tube. The drive motor is customarily disposed at the rear end of the guide tube and drives the tool by means of a drive shaft mounted in the guide tube. In order to transfer torque, the drive shaft is coupled not only with a drive motor but also with the tool, with the free ends of the drive shaft having coupling connections that operate in a positively engaging manner.

It is an object of the present invention to improve an implement of the aforementioned general type in such a way that the weight of the implement is reduced.

BRIEF DESCRIPTION OF THE DRAWINGS

This object, and other objects and advantages of the present invention, will appear more clearly from the following specification in conjunction with the accompanying schematic drawings, in which:

FIG. 2 is a partially cross-sectioned view of the drive shaft;

FIG. 3 is a plan view of an extension for the drive shaft; and

SUMMARY OF THE INVENTION

The implement of the present invention is characterized primarily in that the drive shaft includes a main member in the form of a hollow shaft, the ends of which carry extensions that form the coupling connection.

The hollow shaft, at a considerably lower weight, can transfer the same torque as can a comparable drive shaft having a solid cross-section. In particular for implements having long drive shafts, the use of a hollow shaft for driving a tool can reduce the weight of the implement. The inventive drive shaft includes a main member in the form of a hollow shaft, the ends of which carry extensions that form the coupling cross-section. The extensions, which during operation of the implement are exposed to high stresses as coupling pieces, are therefore made of wear-resistant material.

The hollow main member of the drive shaft is expediently made of a light material, especially or aluminum alloys. Fiber-reinforced polymeric materials, such as CFK, are also particularly suitable. The extensions have an extending axially coupling extension that in the installed state of the drive shaft are brought into operative engagement with corresponding cooperating coupling components of the motor and on the side of the tool. The coupling extensions have other than a circular cross-sectional configuration that is expediently symmetrical with respect to an angle of rotation and is therefore particularly easy during assembly of the drive shaft to bring into overlapping engagement with the cooperating coupling component. A polygonal, expediently square cross-sectional configuration is quite favorable with respect to torque transfer, resistence to wear, and for manufacture. The extensions on the light metal hollow shaft are advantageously made of steel, in which connection it is further proposed that the extensions be hardened, at least in the region of the coupling extensions.

On that side of the extensions disposed opposite from the coupling extensions is a shaft with which the extensions are secured in the interior of the hollow shaft. In this way, the extensions are easy to assemble thereby ensuring a reliable torque transfer between the hollow shaft and the extensions. The shaft of the extensions is expediently screwed or threaded into the end portion of the hollow shaft. However, it can also be advantageous to provide the shaft with a knurling or to press it into the hollow shaft or to provide a press connection via swaging. The connection between the extensions and the hollow shaft can be axially secured by gluing the shaft in.

Further specific features of the present invention will be described in detail subsequently.

DESCRIPTION OF PREFERRED EMBODIMENTS

Figure 1:
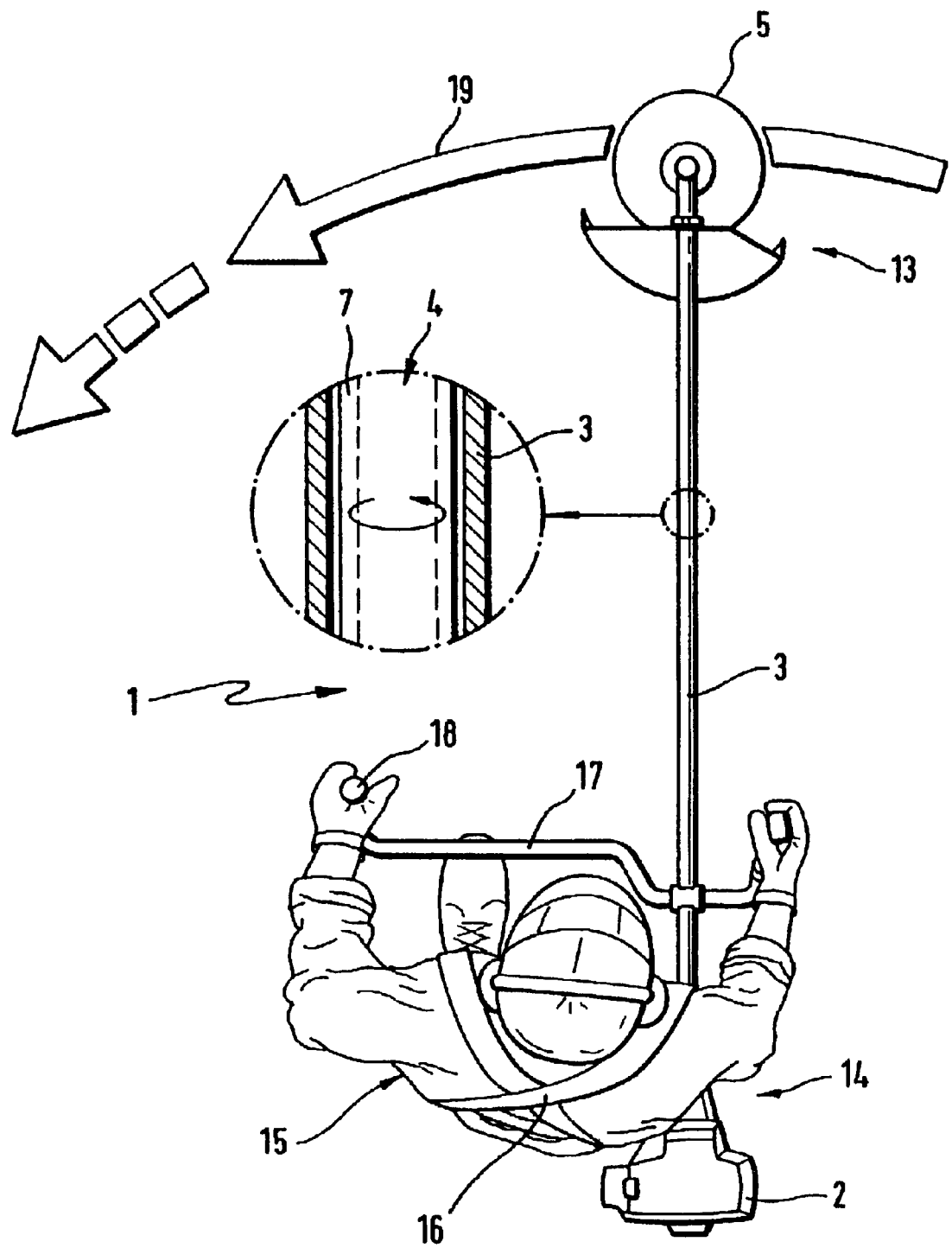
FIG. 1 shows a brush cutter with a drive shaft mounted in the guide tube.
Figure 4:
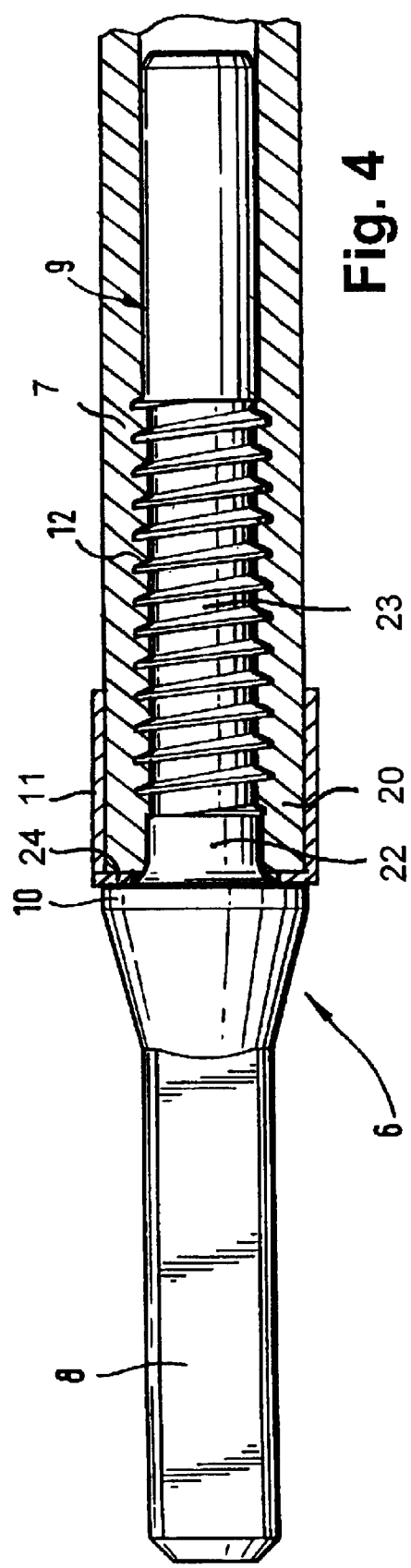
FIG. 4 is a cross-sectional view through a drive shaft in the region of the extension.

Referring now to the drawings in detail, FIG. 1 shows a manually guided brush cutter 1 for mowing grass, undergrowth or the like. The brush cutter 1 is provided with an internal combustion engine 2, which is disposed at the back end 14 of a guide tube 3. Mounted in the guide tube 3 is a drive shaft 4 by means of which the internal combustion engine 2 rotatingly drives the cutting tool 5 at the front end 13 of the guide tube 3, in the present case a cutting blade or a cutting filament head. The brush cutter 1 is carried by an operator 15 by means of a belt or harness system 16. Mounted on the guide tube 3 is a control handle 17, the hand grips 18 disposed at the ends of which can be grasped by the operator in order to be able to move the cutting tool 5 back and forth over the area that is to be mowed in the direction of the arrow 19. The control elements for the internal combustion engine 2, such as a gas lever and the like, are also disposed in the hand grips 18 for guiding the brush cutter.

FIG. 2 shows the drive shaft 4 of the brush cutter; the free ends 21 of the drive shaft 4 are each provided with a coupling extension 8 that operates in a positively engaging manner. In the installed state of the drive shaft 4, the coupling sections disposed at the ends thereof cooperate with correspondingly shaped coupling counter pieces on the driven end (the cutting tool) and on the drive end (the internal combustion engine).

The drive shaft 4 includes a hollow shaft 7 as a base member that with its ring-shaped cross-sectional configuration can, at comparatively less weight, transfer greater torque than can a drive shaft having a solid cross-sectional configuration. The hollow shaft 7 is made of aluminum or some other light metal material, as a consequence of which there results together with the feature of the hollow cross-sectional configuration a very low overall weight of the drive shaft accompanied by high strength. The ends 20 of the hollow shaft 7 carry extensions made of wear-resistant material, in the present case, steel. For a positive transfer of torque, the extensions 6 are provided with coupling extensions 8 having a square coupling cross-section. By means of a shaft 9 that is disposed on the side opposite from the coupling extensions 8, the extensions 6 are guided into the interior of the hollow shaft, where they are secured. In the illustrated embodiment, the extensions 6 are threaded into the end sections of the hollow shaft 7. As an alternative to being provided with a thread, the shaft 9 of the extensions 6 can also be provided with a knurling or the extension 6 can be pressed into the hollow shaft or can be inserted by swaging. The press connection between the extension 6 and hollow shaft 7 can be axially secured by adhesion.

The extensions are made of steel and are hardened, for example, via case hardening. This counteracts the occurrence of wear at the coupling extensions 8. In addition to the low weight of the drive shafts, the inventive configuration with a hollow shaft main member of aluminum has a particularly advantageous elastic torsion spring effect. If during operation of the brush cutter the cutting tool strikes an obstacle, the thereby resulting sudden stress is further transferred to the internal combustion engine in a gently dampened manner. Furthermore, few vibrations are generated during operation of the brush cutter due to the low torsional rigidity of the aluminum shaft.

The length by which the shaft 9 of the extension 6 can be threaded in is delimited by a radial stop or abutment 10. As the extensions 6 are threaded into the hollow shaft 7, the stop 10 comes to an axial rest against an abutment of the shaft main member 7. The extensions 6 are expediently mounted by means of a mounting sleeve 11, each of which receives an end 20 of the hollow shaft 7. By means of an inwardly extending collar, the mounting sleeves 11 are axially braced between the stop 10 of the extension 6 and the end faces of the ends 20 of the aluminum shaft. The sleeves 11 extend about the ends of the shaft and have a diameter that is greater than the diameter of the shaft. The stop 10 of the extensions 6 has a circular configuration and lines up approximately with the sleeve. The sleeves 11 secure the extensions 6 on the ends of the shaft, and preclude damage to the screw threads in the hollow shaft.

FIG. 3 shows an enlargement of an extension 6 as it has been illustrated in FIG. 2 threaded into the end portion of the hollow aluminum shaft 7. To facilitate illustration, the same reference numerals have been used in all of the drawing figures for the same features. The shaft 9 of the extension 6, which is threaded into the hollow shaft, is provided in sections with a self-tapping or self-grooving thread 12. The free end of the shaft 9, which during assembly is initially introduced into the end of the hollow shaft, is not provided with a thread, although it can also be expedient to provide the thread over the entire length of the shaft 9. Thread or screw connections are also conceivable where the end portions of the hollow shaft are provided with a thread, for example with a metric thread, before the correspondingly threaded extension 6 is screwed in.

The connection between the extension 6 and the hollow shaft 7 has a special configuration.

The extension 6 is divided into five sections, namely the coupling extension 8 that forms one end, the stop or abutment 10, a non-threaded central section 22, a threaded section 23 that is provided with the thread 12, and the guide shaft 9, which forms the other end of the extension 6.

Placed onto the mounting end 20 of the hollow shaft 7 is the sleeve 11 which, via a radially inwardly extending collar 24, is disposed between the end face of the mounting end 20 of the hollow shaft 7, and the axial stop 10 of the extension 6.

To mount the extension 6 in the end 20 of the hollow shaft 7, the sleeve 11 is first placed onto the mounting end 20. The sleeve 11 is intended to prevent an expansion of the end 20. A critical feature is the radial collar 24 that is disposed between the axial stop 10 and the end face of the mounting end 20. The guide shaft 9 is now inserted into the mounting end 20, whereby the length of the guide shaft ensures a coaxial alignment of the extension 6 relative to the axis of the hollow shaft 7.

After insertion of the guide shaft 9, the thread 12 of the threaded section 23 comes into engagement with the end 20 of the hollow shaft 7. This thread 12 is, as mentioned previously, a self-tapping or self-grooving, polygonal thread, which cuts into the inner wall of the hollow shaft 7.

The axial stop 10 delimits the depth to which the thread 12 can be screwed into the hollow shaft 7, whereby the non-threaded section 22 is disposed between the threaded section 23 and the stop 10. The central section 22 extends into the mounting end 20 of the hollow shaft 7, whereby after the thread 12, and hence the threaded section 23, have been threaded into the hollow shaft 7 as far as they can go (being delimited by the stop 10), the mounting end 20, which has been slightly elastically expanded due to the thread 12, carries out a return deformation and thus engages the thread 12 from behind in a positive manner. As a result, the extension 6 can be screwed out only with an appropriate application of force; this denotes a protection against the screwing-out of the thread 12 out of the hollow shaft 7.

The thread 12 is screwed into the hollow shaft 7 to such an extent that the collar 24 of the sleeve 11 is securely clamped between the stop 10 and the end face of the mounting end 20. During each rotation of the hollow shaft 7 via the extension 6, the extension is moved in the sense of a tightening relative to the hollow shaft 7. Since the sleeve 11, and the collar 24, protect the mounting end 20 of the hollow shaft 7, a working of the stop 10 into the material of the hollow shaft 7 is reliably prevented. Even after a number of hours of operation, a fixed connection is ensured between the extension 6 and the hollow shaft 7.

The specification incorporates by reference the disclosure of German priority document 199 17 238.2 of Apr. 16, 1999.

The present invention is, of course, in no way restricted to the specific disclosure of the specification and drawings, but also encompasses any modifications within the scope of the appended claims.

What we claim is:

1. An implement having a drive motor and a tool, comprising:

a guide tube;

a rigid drive shaft mounted in said guide tube for interconnecting said drive motor and said tool for rotatingly driving said tool, wherein said drive shaft is a hollow shaft of light weight material having ends on which are disposed respective extensions that each form a coupling connection for a positive engagement, in an installed state of said drive shaft, with coupling means of said drive motor and of said tool respectively, wherein said extensions are made of wear-resistant material, wherein each of said extensions is provided on a first end thereof with an axially extending coupling portion that provides said coupling connection, wherein adjacent to said coupling portion, and proceeding therefrom, said extension is provided, in succession, with an axial stop, a non-threaded central section, and then, remote from said coupling portion, a threaded section having a thread, wherein said extensions are each threaded into an interior of said hollow shaft via said thread of said threaded section, and wherein said stop delimits an insertion depth of said threaded section into said hollow shaft; and a respective sleeve that receives one of said ends of said hollow shaft, wherein said sleeve is provided with a radially extending collar that is disposed between said stop of said extension and an end face of said hollow shaft, and, in the assembled state of the implement, said axial stop of said extension abuts one axial side of said radially extending collar of said sleeve and said hollow shaft abuts an opposed axial side of said radially extending collar of said sleeve with said non threaded central section of said extension being disposed axially between said opposed axial side of said radially extending collar of said sleeve and said threaded section of said extension and said hollow shaft, along the axial extent of said non-threaded central section of said extension, extending radially inwardly of the radially outer extent of said thread of said threaded section of said extension into contact with said non-threaded central section of said extension such that any unthreading movement of said thread of said threaded section of said extension to withdraw said extension from said hollow shaft would result in a cutting by said thread of said threaded section of said extension of the extent of said hollow shaft in contact with said non-threaded central section of said extension, whereby inadvertent axial withdrawal of said threaded section of said extension from said hollow shaft is hindered.

2. An implement according to claim 1, wherein said light weight material of said hollow shaft is aluminum, aluminum alloy, or fiber-reinforced polymeric material.

3. An implement according to claim 1, wherein each of said axially extending coupling portions has a cross-sectional configuration that is other than circular.

4. An implement according to claim 3, wherein said cross-sectional configuration of said coupling portion is symmetrical with respect to an angle of rotation.

5. An implement according to claim 4, wherein said cross sectional configuration is square or otherwise polygonal.

6. An implement according to claim 1, wherein said extensions are made of steel.

7. An implement according to claim 6, wherein said extensions are hardened in a region of said coupling portions.

8. An implement according to claim 1, wherein said threaded section merges into a guide shaft that forms a second end of said extension and is disposed in said hollow shaft.

9. An implement according to claim 8, wherein said guide shaft has a length that is approximately equal to a length of said threaded section.

10. An implement according to claim 8, wherein said guide shaft has a diameter that corresponds approximately to an inner diameter of said hollow shaft.

11. An implement according to claim 8, wherein a free end of said guide shaft is beveled.

* * * * *